United States Patent

Carre

[15] 3,706,990

[45] Dec. 19, 1972

[54] DEVICES FOR ELIMINATING FIXED-ECHOES

[72] Inventor: Roland Carre, Paris, France

[73] Assignee: Thomson-CSF, Paris, France

[22] Filed: June 10, 1970

[21] Appl. No.: 45,128

[30] Foreign Application Priority Data

June 19, 1969 France.................................692058

[52] U.S. Cl. .............................343/7.7, 343/17.1 PF
[51] Int. Cl. ..............................................G01s 9/42
[58] Field of Search .........................343/7.7, 17.1 PF

[56] References Cited

UNITED STATES PATENTS 3,480,953  11/1969  Shreve.................................343/7.7
3,508,262  4/1970  Howells................................343/7.7

Primary Examiner—Benjamin A. Borchelt
Assistant Examiner—G. E. Montone
Attorney—Edwin E. Greigg

[57] ABSTRACT

A wobbulated pulse repetition frequency M.T.I. radar system comprising means carrying out coherent detection of the echo signals, means supplying the differences between successive coherent echo signals of a target and means supplying a weighted sum of two successively supplied differences; the weighting coefficients are so selected that in the resulting sum the spreading of the spectrum of the echoes of the stationary targets, due to the wobbulation, is compensated.

6 Claims, 7 Drawing Figures

DEVICES FOR ELIMINATING FIXED-ECHOES

The present invention relates to electromagnetic detection devices or pulse radars, of the kind in which the recurrence frequency is wobbulated.

As is well known the technique of wobbulating the recurrence frequency of pulse radars is aimed at avoiding, in radar systems of the kind designed to eliminate fixed-echoes or M.T.I. systems, the risk of eliminating echoes from moving targets whose velocity, referred to as a blind velocity, is such that the coherent phase of the corresponding echo varies through $29\pi$ during a recurrence period of the radar.

It will be recalled that the term coherent phase is intended to mean the phase difference between the echo carrier and a wave which is in phase with the corresponding transmitted pulse carrier.

However, wobbulation of the pulse repetition frequency has the undesired effect of spreading out the fixed echo spectrum: In M.T.I. type radar receivers, these spectra then partially mix with those of the moving target echoes and total suppression of the fixed echoes is not achieved, so that the efficiency of these systems is reduced.

In the U.S. Pat. No. 3,444,554 issued on an application filed by the present applicant, a radar system with wobbulation of the repetition frequency was described, in which the fixed echoes are totally eliminated. This result is obtained by means of an additional modulation.

This highly efficient solution relates to radar systems of the kind in which the receivers have adjacent range channels, each having its own filtering circuit, these receivers being known as range gate filters.

The present invention relates to radar systems in which the receivers include a comb filter circuit, that is to say in which, in order to eliminate fixed echoes, the differences of the results of measurements made with several successive recurrences, are taken. In contrast to what happens with receivers of the range gate filter kind where only a first line of the parasitic spectrum has to be eliminated, in comb filter circuit receivers, the whole of the parasitic spectrum has to be suppressed and this is something which cannot be achieved by means of the modulation technique provided for in the Patent referred to.

More particularly, it is an object of the invention to compensate for the spreading out of the spectrum of the fixed echoes in radar systems whose recurrence frequency is wobbulated and in which at reception, the useful signal reflected from a target is formed from the differences of signals successively received from said target.

According to the invention, there is provided a method of compensating for the spread of the spectrum of fixed echoes in radar systems of wobbulated recurrence frequency type, said method comprising the following steps in the reception of the echoes:

forming the differences between two successive echoes from one and the same target;

effecting a weighted sum of said differences, the weighting coefficients being selected to bring these differences to the values which they would have in the absence of any wobbulation; and treating said weighted sum as a useful radar signal.

For a better understanding of the invention and to show how the same may be carried into effect, reference will be made to the drawing accompanying the ensuing description and in which.

Figure 1:
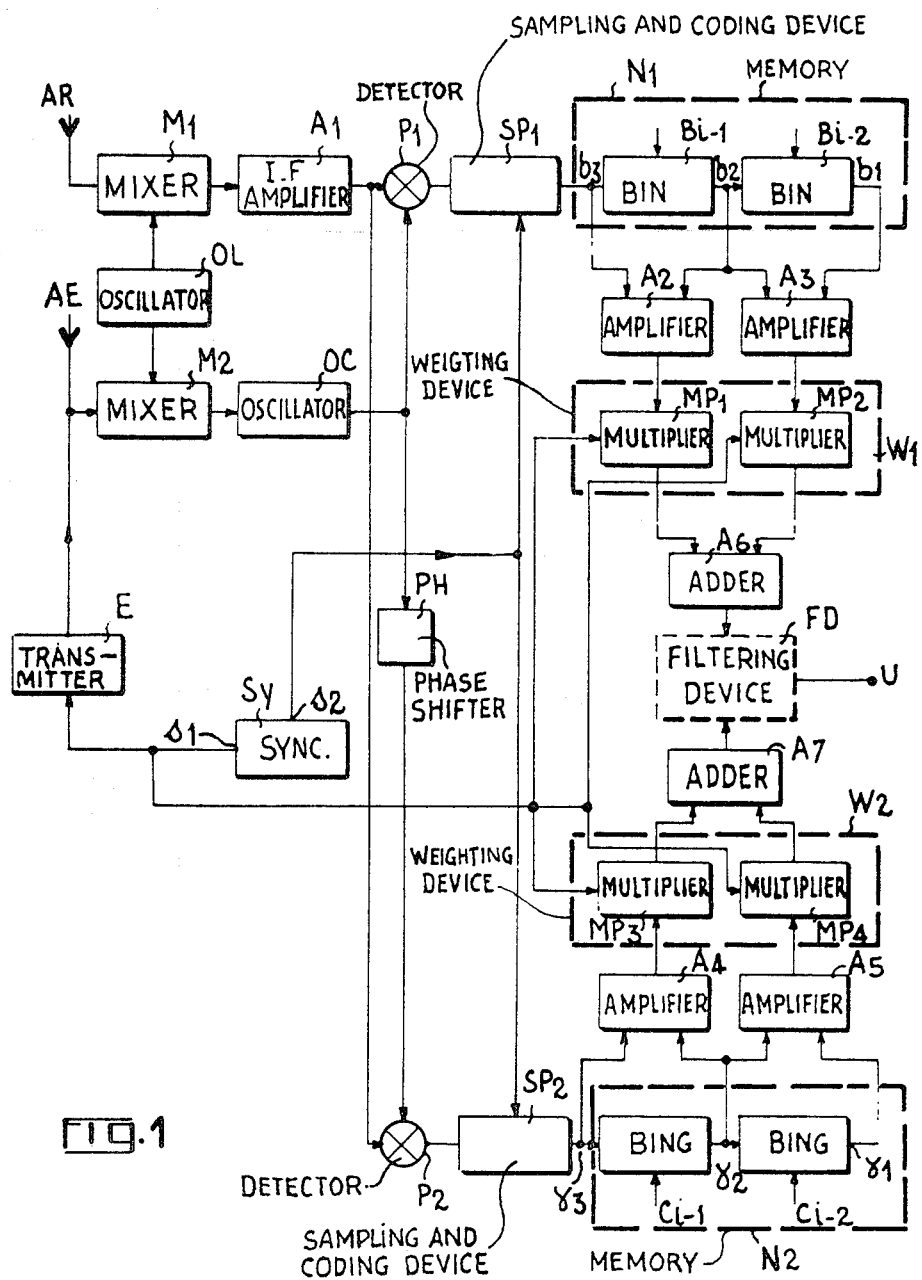
FIG. 1 is a block diagram of a preferred embodiment of the invention.

In FIG. 1 there is shown a block diagram of a pulse radar of the wobbulated repetition frequency type with comb filter circuit arrangements, in which the improvement in accordance with the invention has been incorporated in, it being assumed by way of example that the signals are processed numerically.

The reference E generally indicates the conventional transmitter circuits, Sy the general synchronizing arrangement which produces at the terminal $s_1$ transmission synchronization signals with wobbulated repetition frequency, and at the terminal $s_2$ sampling signals since numerical processing is involved.

A local oscillator OL produces the local signal for the intermediate frequency conversion, in a mixer $M_2$, of the transmitted signals, and, in a mixer $M_1$, of the signals picked up by the receiving antenna AR (this antenna in the present example is shown as distinct from the transmitting antenna AE although it can of course be identical therewith if a duplexer is provided).

The mixer $M_1$ is coupled to the intermediate frequency amplifier $A_1$. The mixer $M_2$ is coupled to the phase control input of the coherent oscillator OC. Two coherent detectors $P_1$ and $P_2$, which are coupled in parallel to the output of the amplifier $A_1$, receive as reference wave the output signal from the coherent oscillator, directly in the case of $P_1$ which supplies the "cosine" receiver channel, and, after a $\pi/2$ phase shift in a phase-shifter PH, in the case of $P_2$ which supplies the "sine" receiver channel. In this example the received signals are processed numerically and accordingly sampler coders $SP_1$ and $SP_2$, controlled by the signals from the terminal $s_2$, are respectively coupled to the outputs of the detectors $P_1$ and $P_2$. In a conventional manner the sampling operations are carried out so that two samples are available for each echo. The samples of each channel are stored in numerical storage circuits $N_1$ and $N_2$ designed so that there are simultaneously available at three terminals, the samples corresponding to three successive recurrences.

For each memory, only the three terminals and the storage positions or bins corresponding to the samples from one and the same target, namely the storage positions $B_{t-2}$ and $B_{t-1}$ for the cosine channel and the terminals $b_1$, $b_2$, $b_3$, and the storage positions $C_{t-2}$ and $C_{t-1}$ for the sine channel and the terminals $\gamma_1$, $\gamma_2$, $\gamma_3$, have been shown. The circuit thus far described is entirely conventional.

In conventional systems, the effective video signal is formed by a fixed combination of the differences between the signals sampled at successive recurrences taken two by two.

These differences are simply added to one another in the amplifiers $A_6$ and $A_7$ and the effective signal obtained at U is derived from this sum for example by detection and filtering in a detector and filtering assembly FD.

In the system in accordance with the invention, however, a weighted sum of these differences is effected, the weighting coefficients varying in time as a function of the wobbulation law.

In each channel, namely the sine and the cosine channels, respective weighting devices $W_1$ and $W_2$ are inserted: for example, between the amplifiers $A_2$, $A_3$ and the amplifier $A_6$, two algebraic multipliers $MP_1$ and $MP_2$ are arranged and between the amplifiers $A_4$, $A_5$ and the amplifier $A_7$, two multipliers $MP_3$ and $MP_4$. These latter are variable coefficient multipliers controlled by the output signals from $s_1$, since, as explained hereinafter, the weighting coefficients are a function of the recurrence considered.

At any instant, the multiplication coefficients of the multipliers $MP_1$ and $MP_2$ are identical to those of the multipliers $MP_3$ and $MP_4$, respectively.

The multipliers are for example designed as digital-to-analog decoders followed by a controlled gain amplifier and an analog-to-digital coder.

It will be seen that the invention can be incorporated into existing systems without a great deal of modification, since it is merely necessary to include the weighting circuits $W_2$ and $W_1$.

At this junction, a detailed description of why the mere inclusion of these circuits makes it possible to overcome the drawbacks due to wobbulation, and of how the weighting coefficients are determined, will be given.

Figure 2:
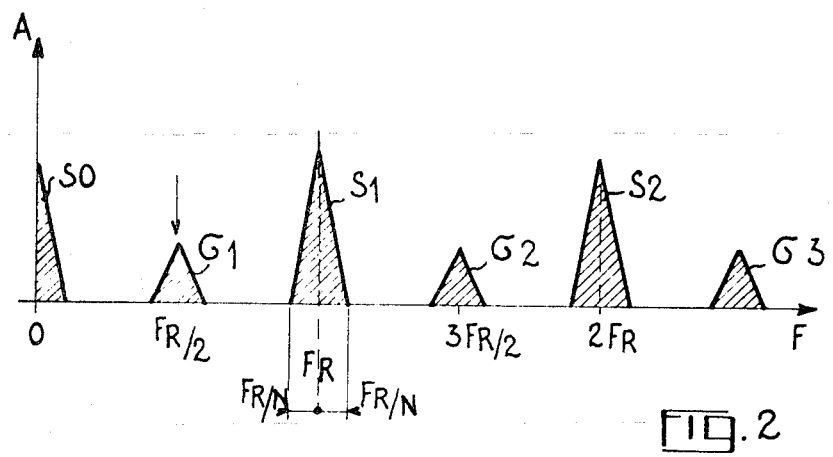
FIGS. 2 to 7 are explanatory diagrams.

By way of example, there has been shown in FIG. 2 the amplitude-frequency spectrum of the fixed echoes in a continuous space-scan system, where the recurrence periodicity is alternately equal to $T + \Delta T$ and $T - \Delta T$.

The elementary spectra of the fixed echoes of width $2 F_R/N$, N being the number of echoes per target and $F_R = 1/T$, have a triangular shape due to the rotation of the antenna, the latter, in the absence of wobbulation, giving rise only to the main spectra $S_0$, $S_1$, $S_2$ ..., the center frequencies $0$, $F_R$, $2 F_R$ ... of which are those of the single spectrum lines which would be obtained from these echoes in the absence of any antenna movement.

The wobbulation introduces parasitic spectra $\sigma_1$, $\sigma_2$. .. The number of parasitic spectra between two main spectra depends upon the number of different periods in the wobbulation law, and their location depends upon the relative values of these periods.

In the example chosen (two periods), there is one parasitic spectrum per mean period, equidistantly disposed between the main spectrum.

Figure 3:
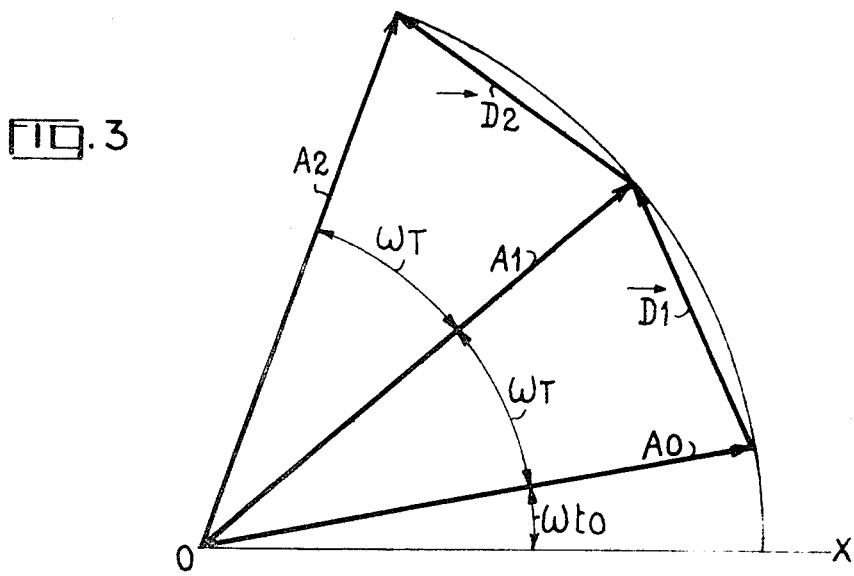

In the absence of any wobbulation, the samples have a spectral component f (f being comprised between $kF_R - F_R/N$ and $kF_R + F_R/N$, k being a whole number); the spectrum due to the movement of the antenna, can be graphically represented by the vectors $\vec{A_0}$, $\vec{A_1}$, $\vec{A_2}$ of FIG. 3 which have the same amplitude A and are spaced from one another by angles $\omega T$ where $\omega = 2\pi f$. The assembly of vectors thus defined can be written broadly as the complex expression $A e^{j2\pi f(t_0+KT)}$, $2\pi f t_0$ being the angle of the first vector ($K = 0$) in relation to a reference axis OX.

The amplitudes of the projections of these vectors onto the axis OX and the axis OY, the latter being derived from OX by rotation through $\pi/2$ in the trigonometric sense, represent the amplitudes of the signals corresponding to this spectral component at the output of the detectors $P_1$ and $P_2$ of FIG. 1, in the absence of any wobbulation.

Using the symbol $\vec{D_i}$ to designate the vectors $\vec{A_i} - \vec{A_{i-1}}$ where $i = 1, 2 \ldots$, and the symbol D to designate the length of the vectors $\vec{D_i}$, the differences between the samples of two successive recurrences can be represented, for the spectral component considered by the vector $D\, e^{j2\pi f(t_0+KT+\phi_0)}$ where $\phi_0$ is a constant.

Figure 4:
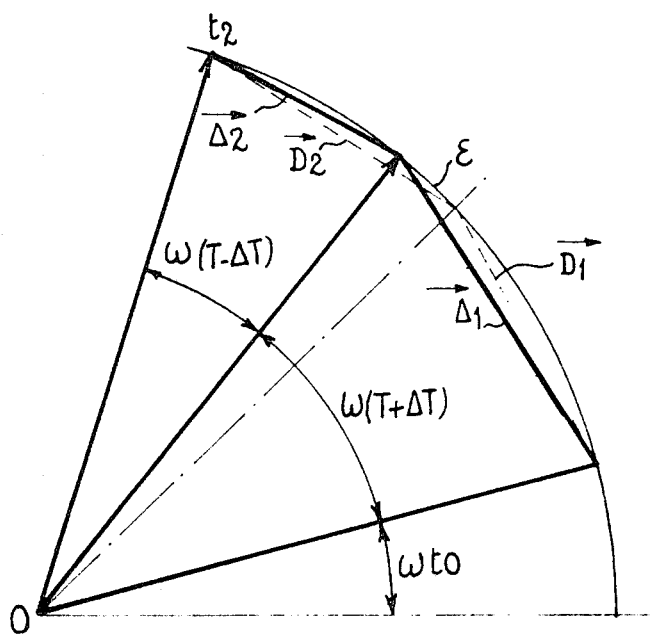

If wobbulation is present, the difference vectors are no longer equal, as FIG. 4 shows. At the instant $t_1$, instead of the difference $\vec{D_1}$, the difference $\vec{\Delta_1}$ is measured and this can be split into two vectors $$\vec{\Delta_1} = D_1 + \vec{\epsilon}$$

At the instant $t_2$, the difference $\Delta_2$ are measured, and this we can write as $\Delta_2 = \vec{D_2} - \epsilon$.

$\vec{D_1}$ and $\vec{D_2}$ are the vectors which would be obtained in the absence of any wobbulation, that is to say the difference vectors of FIG. 3.

The spectrum of the wobbulated differences is thus made up of:

a. a spectrum which is independent of wobbulation and corresponds to the vectors $\vec{D_i}$;

b. a spectrum corresponding to the error vectors such as $\vec{\epsilon}$.

The purpose of the weighting in accordance with the invention is to make the value of the differences $\vec{\Delta_i}$ equal to the differences $\vec{D_i}$. This has the effect of creating supplementary zeros in the parasitic spectra, corresponding to the frequency for which the weighting coefficients have been calculated.

The spectra of the differences being already very much flattened, compensation is effected for virtually the whole of the spectrum if the zero has been located at the center thereof.

In the example of the double recurrence radar, if one takes $f = fm/2$, i.e., $F_R/2N$., the parasitic spectra will be virtually completely eliminated.

Figure 5:
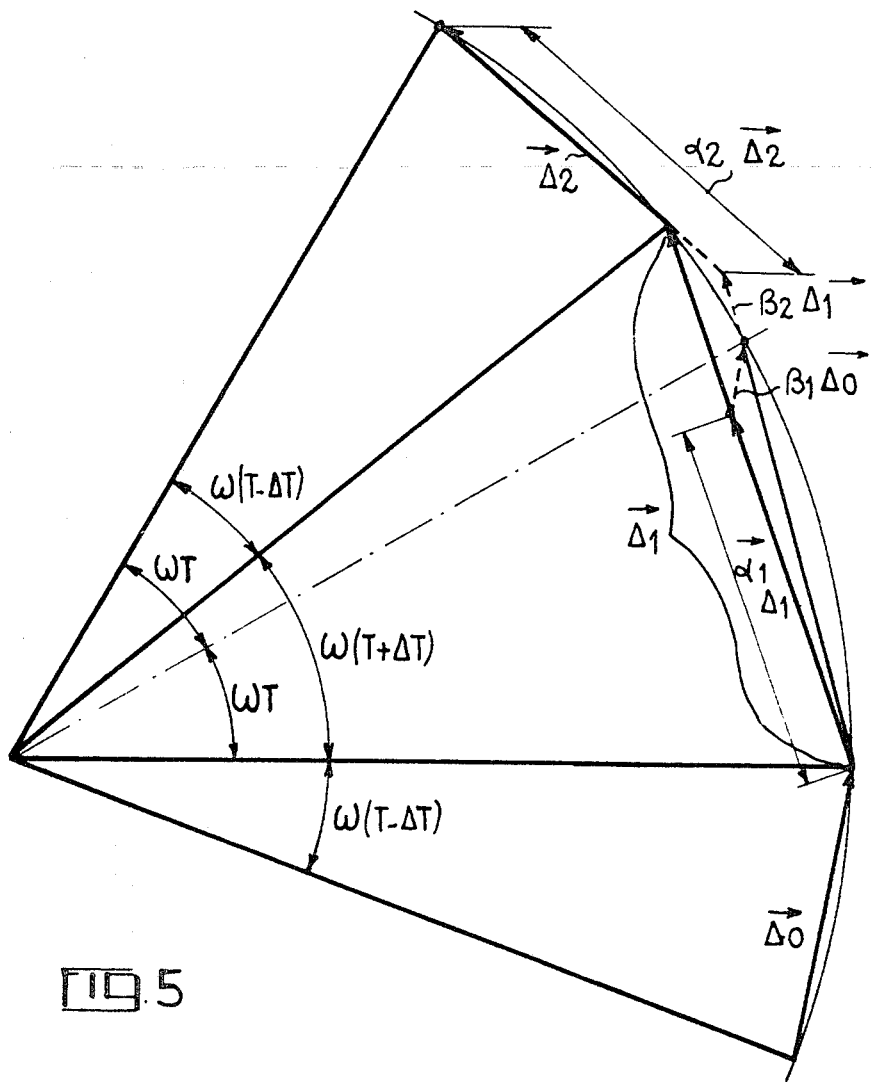

FIG. 5, where the vectors $\vec{\Delta_1}$, $\vec{\Delta_2}$, $\vec{\Delta_3}$ have been drawn in, shows how the vector $\vec{D_2}$ can be reconstituted from the sum of the vectors $\vec{\Delta_2}$ multiplied by the coefficient $\beta_2$ and the vector $\vec{\Delta_1}$ multiplied by coefficient $\beta_2$ $$\vec{D_2} = \alpha_2 \vec{\Delta_2} + \beta_2 \vec{\Delta_1}$$

and, more generally, for a radar whose wobbulation period comprises $n + 1$ pulses or $n$ recurrences, the vector $\vec{D_i}$ (where $i = 1, 2, \ldots n$) can be formed from the vectors $\vec{\Delta_i}$ and $\vec{\Delta_{i-1}}$ by the weighted sum $$\vec{D_i} = \alpha_i \vec{\Delta_i} + \beta_i \vec{\Delta_{i-1}},$$

where $\alpha_2$, $\beta_2$ and, more generally, $\alpha_i$, $\beta_i$, are scalar quantities which are a function of the order i of the recurrence in question.

By putting $T_i$ = period of time between the $i^{th}$ and the $(i+1)^{th}$ pulses of a wobbulation period, where $i = 1, 2, 3 \ldots k$, and $k+1$ is the number of pulses (including the first and the last) respectively numbered 0 to $k$, in a wobbulation period, then if $f$ is close to zero one can write $$\alpha_i = (T/T_i) [1 - (t_{mi}/\Delta t_{mi})]$$

$$\beta_i = (T/T_i)(t_{mi}/\Delta t_{mi}),$$

with the following definitions:

$$T = \text{mean period} = \frac{1}{k} \sum_{j=1}^{j=i} T_j$$

$N$ = number of recurrences per wobbulation period;
$T_i$ = time elapsing between the pulse for which the difference $\Delta_i$ is determined and the preceding pulse, or $i^{th}$ recurrence;
$T_{i-1} = (i-1)^{th}$ recurrence;
$t_{mi}$ = difference between the times elapsed since the first pulse of the period up to the center of the $(i-1)^{th}$ effective recurrence and up to the center of the $(i-1^{th})$ recurrence, i.e., $$t_{mi} = \sum_{j=1}^{j=i-1} T_j + \frac{T_i}{2} - \left((i-1)T + \frac{T}{2}\right)$$

$$\Delta t_{mi} = (T_{i-1} + T_i)/2 .$$

Figure 6:
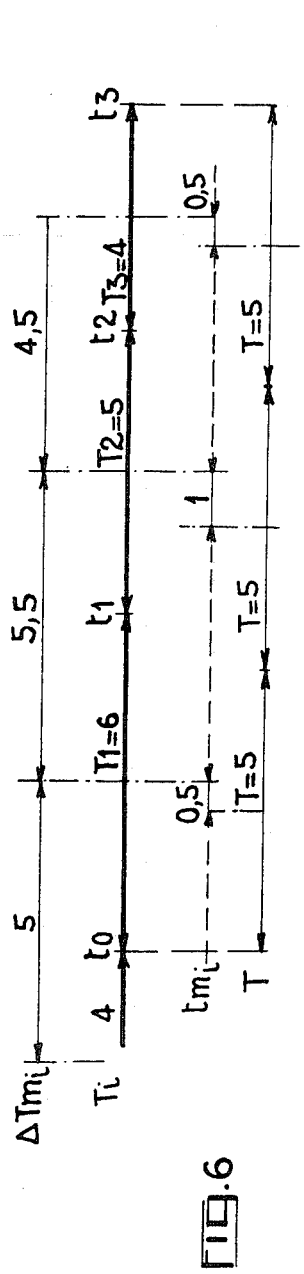

The graph of FIG. 6 illustrates the values of the parameters $T$, $T_i$, $t_{mi}$, $\Delta t_{mi}$ for a wobbulation period, comprising three successive recurrences whose duration are in the ratios 6, 5, 4.

One then has $T_1 = 6; T_2 = 5; T_3 = 4$ $$T = (\tfrac{1}{3})(T_1 + T_2 + T_3) = 5$$

$t_{m1} = 0.5$     $\Delta t_{m1} = 5$
$t_{m2} = 1$     $\Delta t_{m2} = 5.5$
$t_{m3} = 0.5$     $\Delta t_{m3} = 4.5$ which gives $\alpha_1 = 0.75$    and    $\beta_1 = 0.123$
$\alpha_2 = 0.82$           $\beta_2 = 0.15$
$\alpha_3 = 1.11$           $\beta_3 = 0.11$ In the more general case, $\alpha_i$ and $\beta_i$ can be calculated by projecting onto the axes OX and OY, the vectors $D_i$ and $\Delta_i$, $\Delta_{i-1}$. By a more simple graph method, it is possible in each case to determine rapidly the coefficient with an adequate degree of accuracy.

Compensation of the wobbulation, by weighting the differences in accordance with the invention, is a method which is applicable to all radar systems which utilize the Doppler effect and have no range ambiguity. It is particularly useful where the number of echoes per target is small. It is very simple to put into effect and requires little in terms of additional equipment.

The suppression of blind velocities can be obtained by wobbulation proper or "continuous wobbulation" that is to say wobbulation, the periodicity of which is small in relation to the time of revolution of the antenna, or again can be obtained by changing the recurrence frequency with each revolution.

In the first case, compensation must be effected in a continuous way, the various echoes from any target corresponding to pulses transmitted at different time intervals.

In the second case, the repetition frequency, which is constant over a certain number of recurrences, changes drastically at a given bearing $G$, and this produces spreading of the spectra of the fixed echoes, solely in the direction defined by this bearing: compensation will be effected exclusively in relation to targets detected within an angular interval of $G + \Delta G$, where $\Delta G$ is for example the width of the beam produced by the antenna.

It will be effected in respect of a certain number of echoes from this target, as if the change in recurrence frequency had taken place progressively. In this case, the mean period $T$ is not constant but varies.

Figure 7:
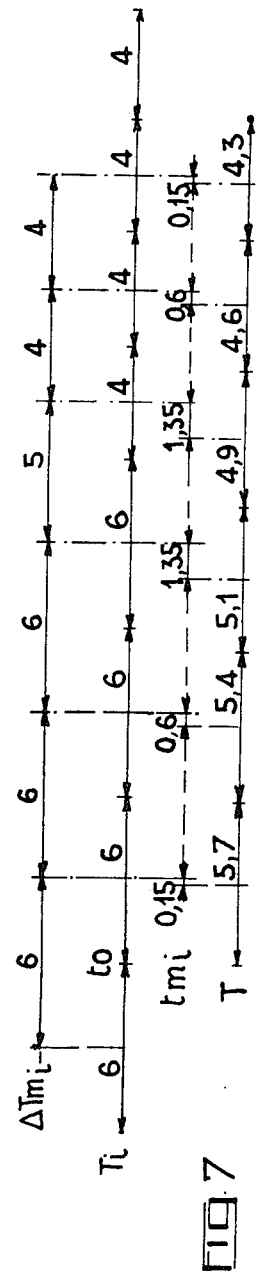

FIG. 7 illustrates the values of the parameters $T$, $\Delta t_{mi}$, $t_{mi}$, in a case of this kind, for a change in the recurrence period in the ratio 6:4. This drastic change is "spread" over a certain number $p$, for example 4, of recurrences to either side of the actual instant of change.

Thus, it is necessary to determine $(2p)$ groups of coefficients $\alpha_i$, $\beta_i$. It will be seen from a consideration of the Figure, that the values of the parameters required in the calculation are respectively:

$\Delta t_{m1} = 6$     $t_{m1} = 0.15$
$\Delta t_{m2} = 6$     $t_{m2} = 0.6$
$\Delta t_{m3} = 6$     $t_{m3} = 1.35$
$\Delta t_{m4} = 5$     $t_{m4} = 1.35$
$\Delta t_{m5} = 4$     $t_{m5} = 0.6$
$\Delta t_{m6} = 4$     $t_{m6} = 0.15$ which gives us $\alpha_0 = 1$     $\beta_0 = 0$
$\alpha_1 = 0.93$     $\beta_1 = 0.02$
$\alpha_2 = 0.81$     $\beta_2 = 0.09$
$\alpha_3 = 0.66$     $\beta_3 = 0.22$
$\alpha_4 = 0.90$     $\beta_4 = 0.22$
$\alpha_5 = 0.98$     $\beta_5 = 0.17$
$\alpha_6 = 1.03$     $\beta_6 = 0.04$
$\alpha_7 = 1$     $\beta_7 = 0$ Of course, the invention is in no way limited to the embodiments described and illustrated which have been given only by way of example.

In particular, it can be applied to systems having only one coherent detection channel, to analog systems and so on, and the number of samples per echo, in the case of a numerical system, may be other than two, the essential thing being that there should be at least one coherent detection channel and means for producing time coincidence between the three successive echoes from one and the same target.

What is claimed is:

1. A method of compensating for the spread of the spectrum of fixed echoes in radar systems of wobbulated recurrence frequency type, said method comprising the following steps in the reception of the echoes:
   forming the differences between two successive echoes from one and the same target;
   selecting weighting coefficients for the sum of said differences to bring these differences to the values which they would have in the absence of any wobbulation; and treating said weighted sum as a useful radar signal.

2. A wobbulated pulse repitition M.T.I. radar system comprising a general synchronizing device, at least one coherent detection channel, including phase detecting means having an output for producing detected coherent echo signals, means coupled to said output, for producing in each channel three successive coherent echoes from one and the same target, means having two outputs for supplying the two differences between said successive coherent echoes taken successively two by two, respectively at said two outputs, a device adding said differences in each channel, said system further comprising in each channel two variable coefficient multipliers, the multipliers of each channel being controlled and synchronized by said general synchronizing system, and being inserted between said two outputs respectively and said adding device.

3. A wobbulated pulse repitition M.T.I. radar system according to claim 2, comprising a first and a second channel, wherein each of said channels comprises a sampling and digital coding means having an input coupled to said phase detecting means output, and an output, wherein said means for producing three successive coherent echoes from one and the same target comprise a memory having an input coupled to said output of said sampling and coding means, and a first and a second output; wherein said differences supplying means comprise a first digital subtractor having two inputs respectively coupled to said memory input and first output, and a second subtractor having two inputs respectively coupled to said memory first and second outputs; and wherein said multipliers of said second channels are respectively identical to the multipliers of said first channel, each of said multipliers comprising in series a digital-to-analog decoding means and a variable gain amplifier.

4. A radar system according to claim 3 further comprising analog-to-digital coding means respectively coupled between said multipliers and said adding device.

5. A method as set forth in claim 1 wherein the weighting coefficients are so selected that in the resulting sum the spreading of the spectrum of the echoes of the stationary targets due to the wobbulation are compensated for virtually the whole of the spectrum.

6. A method as set forth in claim 1 wherein the weighting coefficients vary in time as a function of the wobbulation law.

* * * * *

UNITED STATES PATENT OFFICE
CERTIFICATE OF CORRECTION

Patent No. 3,706,990          Dated    December 19, 1972

Inventor(s) Roland Carre

It is certified that error appears in the above-identified patent and that said Letters Patent are hereby corrected as shown below:

Column 1, line 12, "$29\pi$" should read -- $2\pi$ -- .

Signed and sealed this 29th day of May 1973.

(SEAL)
Attest:

EDWARD M. FLETCHER, JR.          ROBERT GOTTSCHALK
Attesting Officer                   Commissioner of Patents